Sept. 23, 1958　　　M. F. CULBERTSON　　　2,853,236
OCEANOGRAPHIC SLIDE RULE FOR DETERMINING SALINITY
Filed Feb. 3, 1955
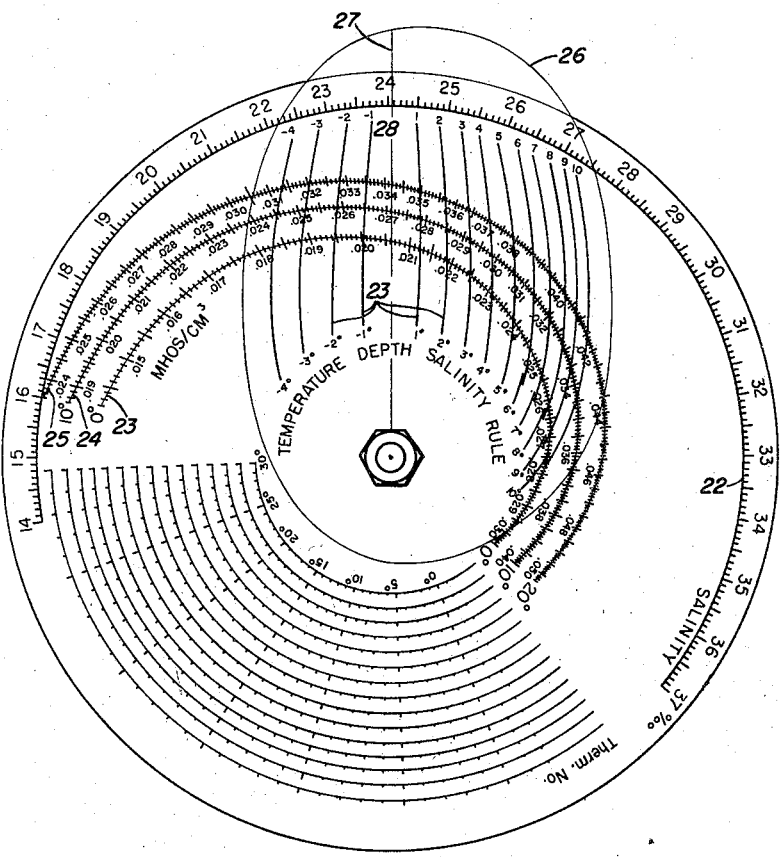
INVENTOR.
MARGARET F. CULBERTSON
BY
ATTORNEYS

United States Patent Office 2,853,236
Patented Sept. 23, 1958

2,853,236

OCEANOGRAPHIC SLIDE RULE FOR DETERMINING SALINITY

Margaret F. Culbertson, San Diego, Calif.

Application February 3, 1955, Serial No. 485,903

7 Claims. (Cl. 235—61)

This invention relates to an oceanographic slide rule, and more particularly to a rotary type calculator for determining salinity from the temperature and electrical conductivity of the sea water. The invention described and claimed herein is disclosed but not claimed in copending application of Margaret F. Culbertson for Oceanographic Slide Rule, Serial No. 575,283, filed March 30, 1956.

The usual procedure for obtaining temperature, depth and salinity in the sea is to lower a series of water bottles on a wire, to each of which are attached two or more deep sea reversing thermometers. Some of the thermometers are protected from the pressure of the water, others are unprotected. When the wire is down at approximately the desired depth, a device causes each bottle to overturn, trapping a water sample and breaking the mercury thread in the thermometers. The point at which the mercury breaks is determined in the case of protected thermometers by temperature alone, and in the case of unprotected thermometers by both temperature and pressure. When the bottles are raised, each thermometer reading must be corrected in two ways. One correction is for the slight change in the reading subsequent to reversal due to the fact the thermometer is read at a temperature different from that at which it reversed. The second correction is for any error in the index scale of the individual thermometer. The corrected reading of a protected reversing thermometer gives the desired temperature of the water at the point of reversal in the sea. The corrected reading of an unprotected thermometer gives a fictitious temperature which depends upon both temperature and pressure at the point of reversal. Since the temperature at that point is known from the protected thermometer, pressure, and hence depth, may be determined. The salinity is usually found by chemical titration of the water sample. However, it may also be determined from the temperature and electrical conductivity of the water.

For correcting the readings of both protected and unprotected reversing thermometers for thermal expansion subsequent to reversal, a pair of novel methods and a suitable slide rule are disclosed in the copending application of Margaret F. Culbertson for Oceanographic Slide Rule, Serial No. 575,786, filed April 3, 1956. This rule has further provision for determination of depth of thermometer reversal from the corrected readings of the protected and unprotected reversing thermometers.

The prior methods for determining salinity involved chemical titration of a sea water sample, or measuring temperature and electrical conductivity and utilizing an unwieldy relationship between salinity, temperature and conductivity. These methods were long and arduous, and either required elaborate equipment or very extensive tables or graphs.

The salinity calculator of the present invention is simple, rugged and easy to use, and measurements of temperature and conductivity are entered directly on the calculator to determine salinity with one setting.

One preferred embodiment of the present invention consists essentially of a disc provided with an annular, equal-division scale representing salinity, within which a plurality of spiral isotherms carry scales representing electrical conductivity of the sea water, and one radial arm having a radial line and a plurality of curved lines representing temperature increments for use in interpolation and extrapolation.

One object of the present invention is to provide a calculator for determining the salinity of sea water in a simple and rapid manner, using the temperature and electrical conductivity of the water as determined by conventional means.

Another object of the present invention is to provide a rotary calculator having a novel arrangement and mode of operation which permits accurate interpolation between known values.

Other objects and many of the attendant advantages of this invention will be readily appreciated as the same becomes better understood by reference to the following detailed description when considered in connection with the accompanying drawings wherein:

The drawing illustrates one preferred embodiment of the salinity rule of the present invention.

Referring now to the drawing, the salinity rule is provided with an annular, equal-division scale 22 graduated in salinity values from 14 to 37 parts per thousand. Three spiral isotherms 23, 24, and 25, having the values 0°, 10° and 20° C. respectively, carry scales representing electrical conductivity in mhos./cm., and are so arranged that a radial line from the center of the disc always passes through corresponding values of temperature and conductivity on an isotherm and salinity on the salinity scale. The radial arm 26 is provided with such a radial line 27 and a plurality of curves 28 representing temperature increments for use in interpolating and extrapolating with respect to the three isotherms of the rule. The temperature curves 28 of the arm 26 are marked from −4° to 10° in a clockwise direction, the 0° line of the series being the straight radial line 27.

In the operation of the salinity calculator only one setting is required to obtain salinity from values of temperature and electrical conductivity. If the given temperature is exactly that of one of the three spiral isotherms 23, 24, and 25, the radial line 27 of the arm 26 is set to the given conductivity on the appropriate isotherm, and salinity is read on the salinity scale 22 under the radial line 27. If the given temperature is not that of one of the three isotherms, one of the curved lines 28 of the arm 26 is set to the given conductivity on an isotherm, the curve selected being that which, added to the value of the isotherm, totals the given temperature. The salinity is then read on the salinity scale 22 under the radial line 27 of the arm 26.

As an example, let the given temperature and conductivity be 14° C. and 0.0300 mhos./cm. Setting the 4° line of the arm to the 10° isotherm at a conductivity of 0.0300 mhos/cm., a salinity of 24.15 parts per thousand is read on the salinity scale 22 under the radial line 27 of the arm 26.

As an aid to understanding the construction of the salinity calculator, it is stated that the lay-out is essentially a circular graph where the circular coordinate is salinity and the radial coordinate is salinity decrease per 5° temperature increase at constant conductivity. Every point of the graph represents a definite value of all three variables, temperature, conductivity and salinity. Lines of constant conductivity, if drawn, would slope upward to the left through the isotherms. However, their position between isotherms is unknown because of the nature of the original data, which gave the relationship between temperature, conductivity and salinity only at 5° temperature intervals, and a differment relationship for each temperature value.

The temperature increment lines of the arm were located by a combination of graphical and numerical difference methods, and are designed accurate for application to the 10° isotherm of the rule. The 0° and 5° lines of the arm are also accurate as applied to the other two isotherms of the rule. This is true of the 5° line of the arm because of the selection of the radial scale, against which all three isotherms were plotted. The other temperature increment lines of the arm are of necessity slightly inaccurate as applied to the 0° and 20° isotherms of the rule, except for the lower off-set portions of lines 6° to 10°, which do not cross the 10° isotherm of the rule and hence were designed accurate for application to the 0° isotherm of the rule.

The circularity of the present salinity calculator is not a necessary part of its design. The calculator could just as well be made in rectangular form.

Obviously this type of calculator may be constructed to serve other purposes. It is therefore to be understood that within the scope of the appended claims the invention may be practiced otherwise than as specifically described.

What is claimed is:

1. An oceanographic rotary calculator for determining salinity comprising a disc having an annular equal-division scale corresponding to salinity in parts per thousand, a spiral scale representing conductivity in mhos per centimeter for a particular temperature, a transparent arm pivotally mounted at the center of said disc, said arm having a radial line thereon indicating the correct salinity reading corresponding to the conductivity at said particular temperature, and indicia means on either side of said radial line representing temperature increments for adjusting the salinity reading for temperatures differing from said particular temperature.

2. An oceanographic rotary calculator comprising a disc having an annular equal-division scale of salinity in parts per thousand, a plurality of spiral curves on said disc representing temperature, each of said curves carrying a scale representing conductivity in mhos per centimeter, a transparent arm pivotally mounted at the center of said disc, said arm having a radial line thereon and a plurality of curved lines on either side of said radial line, the curved lines representing uniform temperature increments for use in interpolating and extrapolating with respect to the temperature curves of said disc.

3. An oceanographic rotary calculator comprising a disc having an annular equal-division scale corresponding to salinity in parts per thousand, a plurality of spiral scales each representing conductivity in mhos per centimeter for a particular temperature, a transparent arm pivotally mounted at the center of said disc, said arm having a radial line thereon and a plurality of curved lines on either side of said radial line, said curved lines representing uniform intervals between the temperatures for which said spiral lines are calibrated.

4. A rotary calculator comprising a disc having an annular equal-division scale representing one quantity, a plurality of spiral scales each representing values of a second quantity for different constant values of a third quantity, a transparent arm pivotally mounted at the center of said disc, said arm having a radial line thereon for reading values of said first quantity and a plurality of curved lines representing uniformly spaced values of said third quantity for intersection with values on said spiral scales for interpolation and extrapolation with respect to said third quantity.

5. A rotary calculator comprising a disc having an annular equal-division scale representing the salinity of sea water, a plurality of spiral scales each representing values of the conductivity of sea water at a different temperature, a transparent arm pivotally mounted at the center of said disc, said arm having a radial line thereon for reading values of salinity corresponding to particular conductivity settings of the line on said spiral scales, and a plurality of radially directed curved lines on said arm representing uniformly spaced temperature values intermediate the temperature values of said spiral scales, said radial line reading values of salinity for specific conductivity settings of specific ones of said curved lines on said spiral scales, said last named salinity values corresponding to temperature values comprising the sum of temperatures respectively depicting specific ones of said spiral scales and said curved lines.

6. An oceanographic rotary calculator for determining salinity comprising a disc having an angular equal-division scale representing salinity in parts per thousand, a plurality of spiral isotherms each carrying a scale representing electrical conductivity in mhos per centimeter, and a transparent arm pivotally mounted at the center of said disc, said arm having a radial line under which salinity is read on the salinity scale for any temperature and conductivity setting, and a plurality of curved lines representing temperature increments for use in interpolating or extrapolating with respect to the isotherms of the disc.

7. A rotary calculator comprising a disc having an annular equal-division scale representing the salinity of sea water, a plurality of spiral scales each representing values of the conductivity of sea water at a different temperature, a transparent arm pivotally mounted at the center of said disc, said arm having a radial line thereon for reading values of salinity corresponding to particular conductivity settings of the line on said spiral isotherms, and a plurality of radially directed curved lines on said arm representing uniformly spaced temperature increments such that when a temperature increment line is placed on an isotherm at a given conductivity, the salinity corresponding to that conductivity and the sum of the two temperatures is read on the annular scale under the straight radial line of the arm.

References Cited in the file of this patent

UNITED STATES PATENTS 2,118,773  Ball _____ May 24, 1938

FOREIGN PATENTS 551,840  Great Britain _____ Mar. 11, 1943